(12) United States Patent
Brückner

(10) Patent No.: US 9,365,106 B2
(45) Date of Patent: Jun. 14, 2016

(54) DEVICE FOR REGULATING AN AIR FLOW TO A COOLER DEVICE OF A VEHICLE AND FRONT END ELEMENT OF A VEHICLE

(71) Applicant: HBPO GmbH, Lippstadt (DE)

(72) Inventor: Reinhold Brückner, Herzebrock-Clarholz (DE)

(73) Assignee: HBPO GmbH, Lippstadt (DE)

( * ) Notice: Subject to any disclaimer, the term of this patent is extended or adjusted under 35 U.S.C. 154(b) by 0 days.

(21) Appl. No.: 14/403,995

(22) PCT Filed: Apr. 30, 2013

(86) PCT No.: PCT/EP2013/059007
§ 371 (c)(1),
(2) Date: Nov. 25, 2014

(87) PCT Pub. No.: WO2013/178419
PCT Pub. Date: Dec. 5, 2013

(65) Prior Publication Data
US 2015/0183313 A1    Jul. 2, 2015

(30) Foreign Application Priority Data
May 31, 2012  (DE) .......................... 10 2012 104 723

(51) Int. Cl.
*B60K 11/08* (2006.01)
*B60K 11/02* (2006.01)

(52) U.S. Cl.
CPC ............. *B60K 11/085* (2013.01); *B60K 11/02* (2013.01)

(58) Field of Classification Search
CPC .............................. B60K 11/08; B60K 11/085
USPC .................................................. 180/68.3, 68.1
See application file for complete search history.

(56) References Cited

U.S. PATENT DOCUMENTS

| | | | | |
|---|---|---|---|---|
| 6,439,328 B1* | 8/2002 | Vaillancourt | ........ | B60K 11/085 123/41.58 |
| 8,627,911 B2* | 1/2014 | Tregnago | ............. | B60K 11/085 180/68.1 |
| 8,646,552 B2* | 2/2014 | Evans | .................. | B60K 11/085 180/68.1 |

(Continued)

FOREIGN PATENT DOCUMENTS

| | | |
|---|---|---|
| DE | 10 2008 006020 A1 | 7/2009 |
| DE | 10 2009 043028 A1 | 3/2011 |

(Continued)

OTHER PUBLICATIONS

International Search Report, mailing date Nov. 9, 2013 for corresponding International Application No. PCT/EP2013/059007, with English translation.

*Primary Examiner* — Jeffrey J Restifo
(74) *Attorney, Agent, or Firm* — Intellectual Property Law Group LLP

(57) ABSTRACT

The invention relates to a device (1) for regulating an air flow to a cooler device of a vehicle, wherein the air flow is directed through at least one opening (21) in a bumper cover (20) onto the cooler device, and a shutter element (10) is provided which can be adjusted between a first (11) and at least one second position (12), wherein the shutter element (10) releases the opening (21) in the first position (11) and at least partially closes it in the at least one second position (12). According to the invention, a supporting element (22) is provided on and/or in the opening (21) which supports the shutter element (10) in the at least one second position (12).

22 Claims, 7 Drawing Sheets

(56) References Cited

U.S. PATENT DOCUMENTS

| | | | |
|---|---|---|---|
| 8,689,917 B2* | 4/2014 | Miesterfeld | F01P 7/10 180/68.1 |
| 8,997,907 B2* | 4/2015 | Rode | B60K 11/085 180/68.1 |
| 2006/0102399 A1* | 5/2006 | Guilfoyle | B60K 11/04 180/68.1 |
| 2010/0071977 A1* | 3/2010 | Ritz | B60K 11/085 180/68.1 |
| 2010/0243351 A1* | 9/2010 | Sakai | B60K 11/085 180/68.1 |
| 2010/0282533 A1* | 11/2010 | Sugiyama | B60K 11/085 180/68.1 |
| 2011/0139525 A1* | 6/2011 | Karl | B60K 11/02 180/68.1 |
| 2011/0203861 A1* | 8/2011 | Charnesky | B60K 11/085 180/68.1 |
| 2012/0091757 A1* | 4/2012 | Tregnago | B60K 11/085 296/193.1 |
| 2012/0132474 A1* | 5/2012 | Charnesky | B60K 11/085 180/68.1 |
| 2013/0092462 A1* | 4/2013 | Chinta | B60K 11/08 180/68.1 |
| 2013/0252538 A1* | 9/2013 | Huber | F24F 7/04 454/333 |
| 2013/0264133 A1* | 10/2013 | Remy | B60K 11/085 180/68.1 |
| 2014/0216834 A1* | 8/2014 | Elliott | B60K 11/085 180/68.1 |
| 2014/0291056 A1* | 10/2014 | Takanaga | B60K 11/085 180/274 |
| 2015/0183313 A1* | 7/2015 | Bruckner | B60K 11/02 180/68.1 |

FOREIGN PATENT DOCUMENTS

| | | |
|---|---|---|
| DE | 10 2010 021485 A1 | 9/2011 |
| DE | 10 2011 011035 A1 | 3/2012 |
| FR | 2 738 779 A1 | 3/1997 |

* cited by examiner

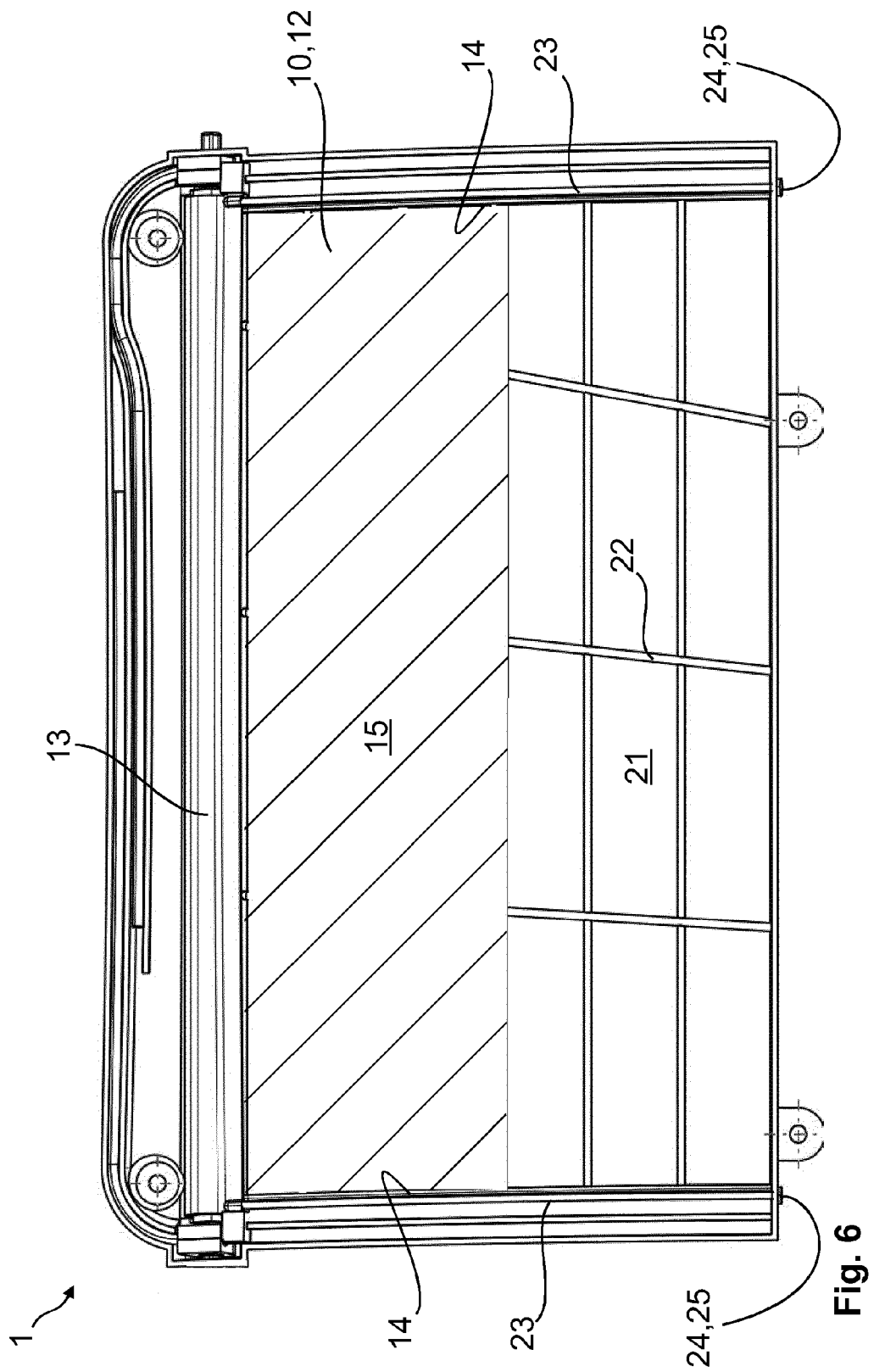

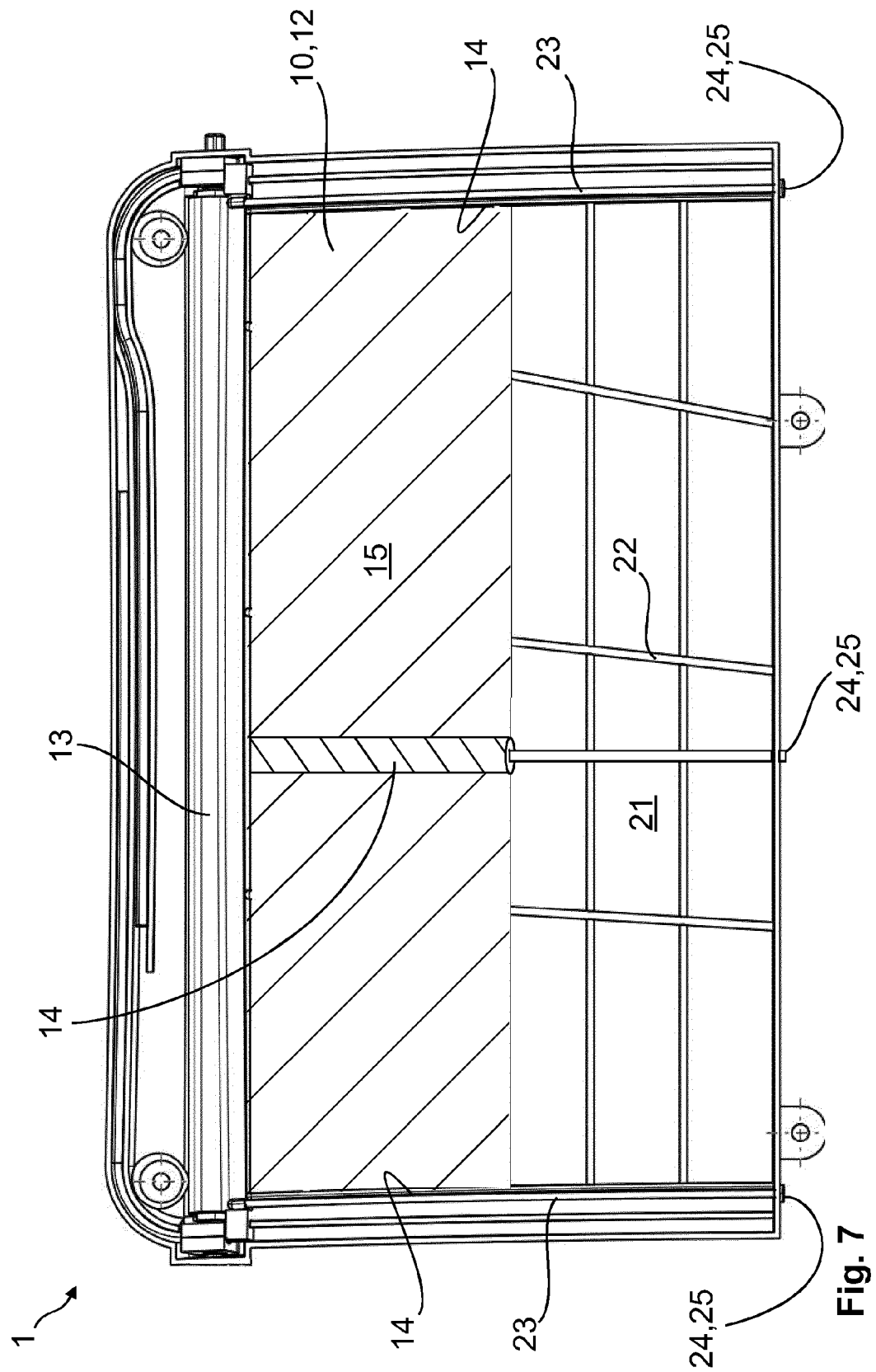

DEVICE FOR REGULATING AN AIR FLOW TO A COOLER DEVICE OF A VEHICLE AND FRONT END ELEMENT OF A VEHICLE

CROSS-REFERENCE TO RELATED APPLICATIONS

This application is a U.S. National Phase application, under 35 U.S.C. §371, of International Application no. PCT/EP2013/059007, with an international filing date of Apr. 30, 2013, and claims benefit of German Application no. 10 2012 104 723.5 filed on May 31, 2012, which are hereby incorporated by reference for all purposes.

BACKGROUND OF THE INVENTION

1. Field of the Invention

The invention relates to a device for regulating an air flow to a radiator device of a vehicle, wherein the air flow is conducted through at least one opening in a bumper cover onto the radiator device, and a roller blind element which is adjustable between a first position and at least one second position is provided, wherein the roller blind element opens up the opening in the first position and at least partially closes said opening in the at least one second position. The invention furthermore relates to a front end element for a vehicle, at least having an assembly support, a radiator device, a bumper cover, wherein the radiator device and the bumper cover are fastened to the assembly support, a radiator grille arranged on the bumper cover, wherein at least one opening for conducting an air flow onto the radiator device is provided in the bumper cover, and a device for regulating the air flow with a roller blind element, wherein the roller blind element is adjustable between a first position and at least one second position, and wherein the roller blind element opens up the at least one opening in the first position and at least partially closes said opening in the at least one second position.

2. Background Art

In modern vehicles, in particular in motor vehicles, fresh air flowing through a radiator grille of the vehicle or through the openings in the radiator grille is channeled and conducted onto a radiator device of the vehicle. By means of this specific channeled conducting of the air flow onto the radiator device, it can be ensured that, for example, the vehicle engine can be efficiently cooled and/or the vehicle interior can be efficiently air conditioned.

Systems with a controllable cooling air inlet are used, inter alia, for reducing the $CO_2$ emission, in particular in motor vehicles. Said systems can primarily shorten the cold running phase and can ensure a more rapid reaching of the operating temperature of the motor vehicle engine. In order in addition to configure the aerodynamic drag of the vehicle to be as small as possible, it is endeavored to place said system as far to the front as possible in the region of the cooling air inlet. In particular, the effect which can be achieved by this is that an air cushion which forms between the cooling air inlet and the system for controlling the cooling air inlet and which has a negative effect on the aerodynamic drag of the vehicle can be designed so as to have as small dimensions as possible.

It is known to use flap systems in such devices for regulating an air flow. However, said flap systems, when open, and depending on the flap height, require a considerable amount of space in the longitudinal direction of the vehicle. Furthermore, the air flows are conducted away by the flaps in accordance with the different opening angles of the flaps and thus cannot be optimally used at all times.

In order to circumvent these disadvantageous properties of flap systems in devices for regulating an air flow, it may be of advantage to replace the flap systems by means of a roller blind element. For example, DE 10 2009 043 028 A1 discloses a roller blind element for closing a cooling air inlet for a motor vehicle. The roller blind element is driven via a cable pull and can be guided at its lateral ends in a slot. However, in particular at high speeds, at which closing of the cooling air inlet may be necessary in order to achieve a particularly favorable aerodynamic drag of the motor vehicle, the air contact pressure against the roller blind element may push the latter out of the guide and therefore, firstly, the cooling air inlet is no longer completely closed and, secondly, a favorable, lower aerodynamic drag of the vehicle can no longer be achieved.

SUMMARY OF THE INVENTION

It is therefore the object of the present invention to eliminate the abovementioned disadvantages of known air guiding systems. In particular, it is the object of the invention to provide a device for regulating an air flow to a radiator device of a vehicle and also a front end module of a vehicle, which device and front end module permit a particularly stable and durable, controlled at least partial closing of a cooling air inlet in a simple and cost-effective manner, wherein as little demand for construction space as possible can be achieved at the same time.

The above object is achieved by a device for regulating an air flow with the features of independent claim 1 and by a front end element for a vehicle with the features of independent claim 15. Further features and details of the invention emerge from the dependent claims, the description and the drawings. In this context, features and details which are described in connection with the device according to the invention also apply, of course, in connection with the front end element according to the invention and vice versa, and therefore, with regard to the disclosure, reference is or can always be made to the individual aspects of the invention reciprocally.

According to a first aspect of the invention, the object is achieved by a device for regulating an air flow to a radiator device of a vehicle, wherein the air flow is conducted through at least one opening in a bumper cover onto the radiator device, and a roller blind element which is adjustable between a first position and at least one second position is provided, wherein the roller blind element opens up the opening in the first position and at least partially closes said opening in the at least one second position. In particular, the device for regulating an air flow is characterized in that a supporting element which supports the roller blind element in the at least one second position is provided on and/or in the opening.

The device according to the invention for regulating an air flow enables the supply of air to the radiator device of the vehicle to be designed in a variable manner. Thus, in particular at the beginning of the operation of the vehicle for a warming-up phase, complete closing of the opening by the roller blind element in its second position is possible. This means that the radiator device of the vehicle is not cooled by the air flow and that the vehicle engine can heat up more rapidly. The warming-up phase of the vehicle can be shortened as a result. After such a warming-up phase, it may be favorable to open up the opening again, and, as the result thereof, the roller blind element is brought again into its first position in which it opens up the opening. In this case, cooling of the radiator device by the air flow is no longer prevented, and the vehicle engine can be efficiently cooled by the radiator device. In particular at particularly high speeds, for the achieving of which a particularly low aerodynamic drag of the vehicle is favorable, the roller blind element can be brought again into its at least one second position, and therefore air no longer enters through the at least one opening in the bumper cover and the aerodynamic drag of the vehicle can thus be reduced. Especially, but not exclusively, in the last example, the supporting element provides the roller blind element with stability. A fluttering of the roller blind element can also be prevented, in particular at high speeds, especially if the roller blind element in its at least one second position does not completely close the opening. This furthermore reduces the risk of destruction of the roller blind element by the appearance of cracks in the roller blind element. Furthermore, the roller blind element can be supported by the supporting element to the effect that as uniform and smooth a surface as possible is formed for the incoming air. This feature can also have a positive effect on the aerodynamic drag of the vehicle. In particular if the roller blind element in its at least one second position completely closes the opening, there is furthermore a particularly good delimitation of the vehicle engine compartment from the outside world. Overall, it is furthermore possible for the roller blind element itself to be formed from a correspondingly less stable material because of the support of the roller blind element by the supporting element. A saving on weight can thus be produced.

Furthermore, provision can be made, in a device according to the invention for regulating an air flow, for the supporting element to be configured in the manner of a lattice. A lattice-like supporting element has particularly high stability with simultaneously high air permeability, in particular in a first position of a roller blind element. By means of a configuration of the supporting element in the form of a lattice, the two advantages of readily supporting the roller blind element while simultaneously obstructing the air flow as little as possible can therefore be realized. A lattice-like supporting element also constitutes a configuration of a supporting element by means of which as high a degree of stability with as little consumption of material as possible can be achieved. Moreover, when the device for regulating an air flow is arranged behind a radiator grille, it may be of advantage to adapt the lattice-like shape of the supporting element to the shape of the radiator grille. It is thus possible to achieve a particularly good and trouble-free air flow.

Furthermore, provision can be made, in a device according to the invention for regulating an air flow, for those sections of the supporting element which are used for supporting the roller blind element to be configured to be smooth, in particular rounded. During operation, the roller blind element, in particular in its at least one second position, can rest on the supporting element. By means of the configuration of those sections of the supporting element which are used for supporting the roller blind element, and therefore those sections of the supporting element on which the roller blind element rests, in a smooth, in particular rounded manner, the roller blind element can be protected. In particular, the supporting element advantageously does not have any sharp edges in these sections. Destruction of the roller blind element by the supporting element, in particular even at high contact pressures of the roller blind element against the supporting element, can therefore be reliably avoided.

Furthermore, a device according to the invention for regulating an air flow can be configured to the effect that the supporting element is designed as an, in particular supporting, part of the bumper cover. In particular, the supporting element here can be manufactured from an, in particular stiffer, plastic than at least parts of the remaining bumper cover. The bumper cover of a vehicle is provided to the effect that, in the event of a collision of the vehicle, at least some of the collision energy can be absorbed by deformation. The bumper cover is therefore customarily manufactured from a dimensionally stable, but flexible plastic which is customarily supported by additional, more stable components. As a result of the fact that the supporting element is designed as a supporting part of the bumper cover, the supporting element provides the bumper cover with stability. Additional components for supporting the stability of the bumper cover can therefore be spared, or at least the requirement for such additional components can be reduced.

Provision can advantageously be made, in a device according to the invention for regulating an air flow, for the device to have a drive element, in particular a winding element, for adjusting the roller blind element. A winding element here is understood as meaning, in particular, any device for winding up the roller blind. In particular, for example, cable pulls, spirals or other electric drives are conceivable here as the drive element for the roller blind element. The roller blind element is adjusted here in a manner driven by the drive element. A winding element here, for example a driven, cylindrical component, onto which the roller blind element is wound, is a particularly simple drive element which, in addition, is particularly space-saving.

Moreover, provision can be made, in a device according to the invention for regulating an air flow, for the supporting element to have at least one receptacle for receiving a border of the roller blind element. The receptacle of the supporting element here can constitute, in particular, a guide for the border of the roller blind element. A particularly good and defined support of the roller blind element and particularly good sealing of the opening are thereby produced in the region of the receptacle and of the border of the roller blind element. Furthermore, the border of the roller blind element, in particular if the roller blind element is in its at least one second position, is subjected to large forces which may cause the border to flutter. This fluttering can be prevented by the supporting-element receptacle which is configured for receiving the border of the roller blind element. Protection against tearing of the border and therefore against destruction of the roller blind element can thereby be achieved.

A device according to the invention for regulating an air flow can advantageously be configured to the effect that the supporting element has at least one guide element for guiding the roller blind element during the adjustment of the roller blind element. By means of the guide element, in addition to the rest of the supporting element, a definition of the profile of the roller blind element and therefore a more defined local adjustment are possible. The guide element here can also have, for example, a curved profile which the roller blind element follows during the adjustment between its positions. By means of a guide element of this type, it is therefore possible decisively to influence the geometrical shape of the area which the roller blind element adopts in its at least one second position.

According to a development of a device according to the invention for regulating an airflow, it can be provided that the at least one guide element is configured as an inner support which can be encompassed by a border of the roller blind element. A particularly good support between the guide element and the roller blind element can be ensured by the encompassing of the guide element, which is configured as an inner support, by a border of the roller blind element. The border of the roller blind element here can be, in particular, an eyelet, for example. Of course, a border can also be woven into the roller blind element, in particular woven therein seamlessly, in such a manner that the border is configured to encompass a guide element configured as an inner support. Such a border which is configured to encompass an inner support can, of course, also be provided here not only on an edge of the roller blind element, but also within a surface of the roller blind element.

Provision can preferably be made, in a device according to the invention for regulating an air flow, for the roller blind element to comprise a technical fabric and/or a sheeting, in particular a plastics sheeting, and/or a fiber composite material. A technical fabric here is a fabric which is used in particular for technical-industrial purposes. Said fabric generally involves a material which is designed in accordance with the anticipated demands. In particular, the technical fabric and/or the sheeting which the roller blind element comprises are selected here in such a manner that they can withstand the demands, such as, for example, high temperature differences, moisture and wetness and also high air contact pressures. In particular, provision can be made here to use, for the roller blind element, a technical fabric which is already used, for example, for manufacturing roof structures of convertibles. By means of this fabric which already exists, costs which would arise due to a new development, can be saved.

Furthermore, provision can be made, in a device according to the invention for regulating an air flow, for the roller blind element to have at least one heating element. It is thereby possible, for example, to undertake active deicing of the roller blind element. This makes it possible to ensure reliable operation of the roller blind element, even in the event of external temperatures below freezing.

Moreover, provision can be made, in a device according to the invention for regulating an air flow, for the roller blind element to have at least one, in particular colored, display element. Such a display element can then be visible in particular when the roller blind element is in its at least one second position. For example, it is conceivable to provide different colored display elements of the roller blind element for certain different types of vehicle engine. It is therefore possible, for example, already to identify the type of engine of the vehicle when the engine hood of the vehicle is still closed. Furthermore, it is also possible, for example, to configure the roller blind element, in particular the visible parts of the roller blind element, in the car color. As a result, for example, in particular a more standard appearance of the front of a vehicle can be achieved. Furthermore, by means of the in particular colored display elements, the design and the shape of a radiator grille of the vehicle can be established and/or supported.

Furthermore, provision can be made, in a device according to the invention for regulating an air flow, for the roller blind element to have at least one illuminating element. With such an illuminating element, it is possible actively to illuminate at least a part of a front end module and/or front of a vehicle. In particular, parts of the vehicle air guide that can only be reached with difficulty by external light sources, such as, for example, torches, can thus also be effectively illuminated. Of course, an illumination of a radiator grille of the vehicle is also conceivable.

Provision can be made, in a particularly preferred embodiment of a device according to the invention for regulating an air flow, for the roller blind element to be of multi-part configuration. As a result, in particular, an air flow control which is more precise and is more adapted to the situation is possible, since in particular the individual parts of the roller blind element can be activatable separately from one another. Furthermore, if each of the individual parts of the roller blind element is equipped with a dedicated drive configured as a winding element, said winding elements can be configured to be smaller and therefore more space-saving. The space required by the device for regulating an air flow, in particular the space required in the longitudinal direction of the vehicle, can thus be further reduced.

Moreover, provision can be made, in a device according to the invention for regulating an air flow, for the roller blind element to be configured for the at least partial horizontal or vertical closing of the at least one opening. It is thereby possible to configure the roller blind element in such a manner that it meets the requirements for a very wide variety of types of vehicle. In particular, provision can be made, for example in a two-part roller blind element, for the opening to be able to be closed vertically, wherein each of the parts of the roller blind element closes half of the opening. If, for example, only one individual roller blind element is provided, it may be of advantage for said roller blind element to close the opening vertically in order to ensure as uniform as possible an air flow onto the radiator device of the vehicle at all times.

According to a second aspect of the invention, the object is achieved by a front end element of a vehicle, at least having an assembly support, a radiator device, a bumper cover, wherein the radiator device and the bumper cover are fastened to the assembly support, a radiator grille arranged on the bumper cover, wherein at least one opening for conducting an air flow onto the radiator device is provided in the bumper cover, and a device for regulating the air flow with a roller blind element, wherein the roller blind element is adjustable between a first position and at least one second position, and wherein the roller blind element opens up the at least one opening in the first position and at least partially closes said opening in the at least one second position. In particular, the front end element of a vehicle is characterized in that a support element which supports the roller blind element in the at least one second position is provided on and/or in the opening.

A front end element substantially forms the front of a vehicle. Frequently, for example, a radiator device and the associated air guide are integrated in such a front end element. Furthermore, a front end element frequently has further functional components, such as, for example, elements of an impact protection system of the vehicle, for example a bumper with a bumper cover. In this case, essentially all of the subassemblies of a front end element are arranged on and fastened to an assembly support of the front end element.

In order to be able to variably regulate an air supply to the radiator device, a device for regulating the air flow, which is provided with a roller blind element, is provided. The roller blind element here is configured to be adjustable between a first and at least one second position and to the effect of opening up or at least partially closing an opening in the bumper cover, which opening constitutes part of the air guide to the radiator device. The variable positions of the roller blind element thereby permit reaction to different operating parameters or operating phases during the operation of the vehicle. Thus, at the beginning of the operation of the vehicle, it may be of advantage to close the opening in the bumper cover by the device in order to accelerate a heating-up operation of the vehicle engine. During normal operation, it may be of advantage to open up the opening again by means of the roller blind element in order to permit effective cooling of the engine by the radiator device. At particularly high speeds, in turn, it may be of advantage to close the opening again in order to reduce the aerodynamic drag of the vehicle. Of course, it is conceivable to adjust the roller blind element between a plurality of second positions in order to be able to set a strength of the air flow to the radiator device to be as variable and adapted to the situation as possible. Particular stability of the roller blind element can be achieved by the provision of the supporting element. The roller blind element does not itself have to be of stable design in order to achieve this stability, but rather can therefore be configured more flexibly. A more flexible, in particular curved, geometry of the roller blind element is therefore possible. By means of the supporting element, the roller blind element is provided with stability, and fluttering due to high air contact pressure and a possibly associated tearing, in particular at the sides of the roller blind element, can therefore be avoided.

According to a preferred development of a front end element according to the invention for a vehicle, provision can be made for the device for regulating an air flow to be configured according to the first aspect of the invention. All of the advantages and details which have been described with respect to a device for regulating an air flow according to the first aspect of the invention therefore also apply to a front end element for a vehicle that has such a device.

Furthermore, provision can be made, in a front end element according to the invention for a vehicle, for the roller blind element to be arranged between the bumper cover and the radiator grille. The radiator grille forms the front end of the front end element and therefore of the vehicle. By means of an arrangement of the roller blind element directly behind the radiator grille and in front of the bumper cover, an arrangement of the roller blind element particularly far to the front in the vehicle is possible. When a roller blind element is closed, the air pocket which is formed, i.e. the air volume between roller blind element and front end of the vehicle, is configured to be particularly small. When the roller blind element is closed, a particularly low aerodynamic drag of the vehicle can thereby be achieved. This is of advantage in particular at very high speeds of the vehicle, when the roller blind element is closed, in order to achieve a particularly low aerodynamic drag of the vehicle.

BRIEF DESCRIPTION OF THE DRAWINGS

Further advantages, features and details of the invention emerge from the description below in which exemplary embodiments of the invention are described in detail with reference to drawings. The features mentioned in the claims and in the description can relate here in each case individually by themselves and in any combination to all of the figures of the drawings, in which, in each case schematically:

FIG. 6 shows a view of parts of a device according to the invention, and FIG. 7 shows a view of parts of a further embodiment of a device according to the invention for regulating an air flow.

DETAILED DESCRIPTION OF SPECIFIC EMBODIMENTS

Figure 1:
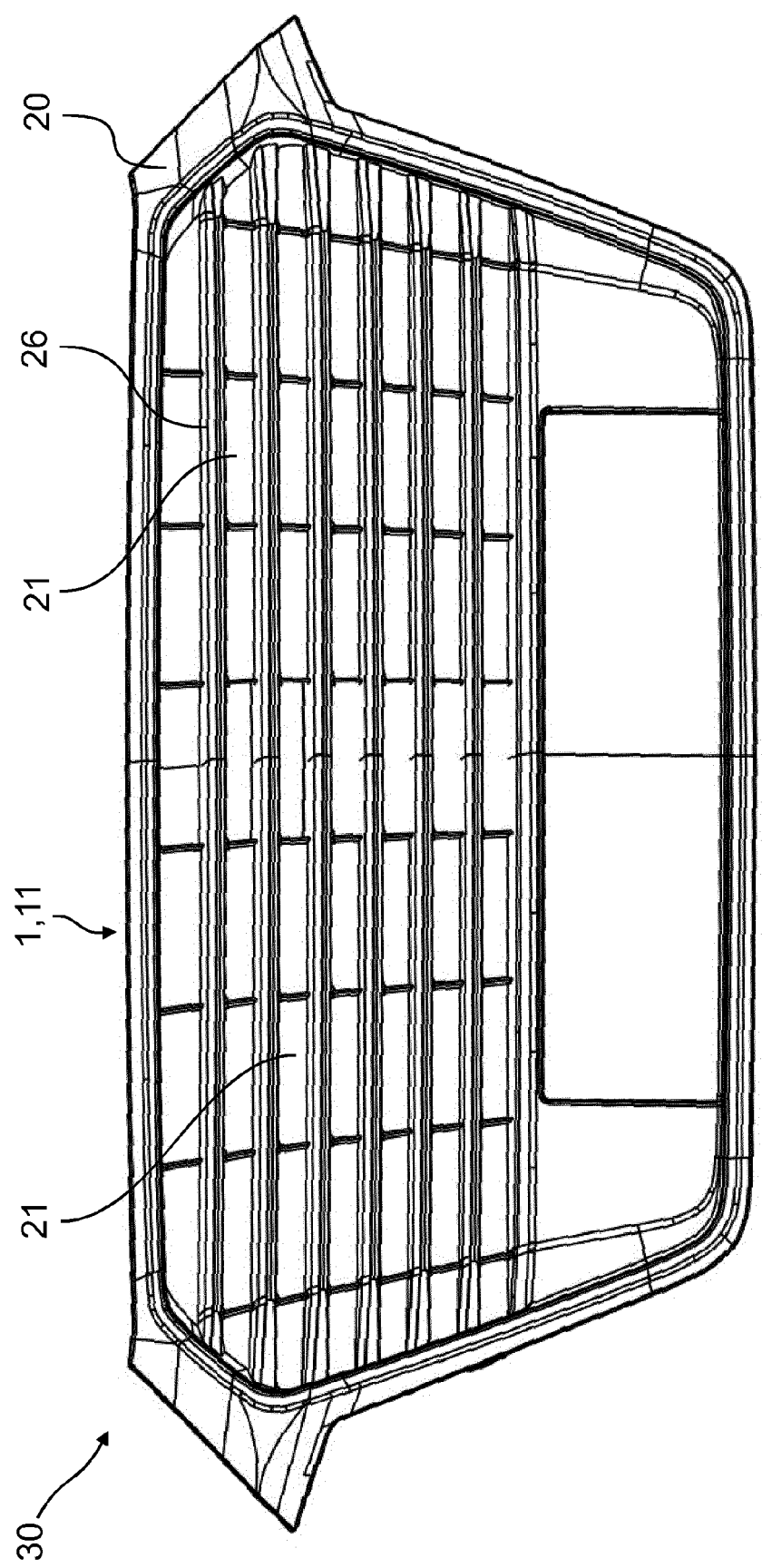
FIG. 1 shows a front view of parts of a front end element according to the invention.
Figure 2:
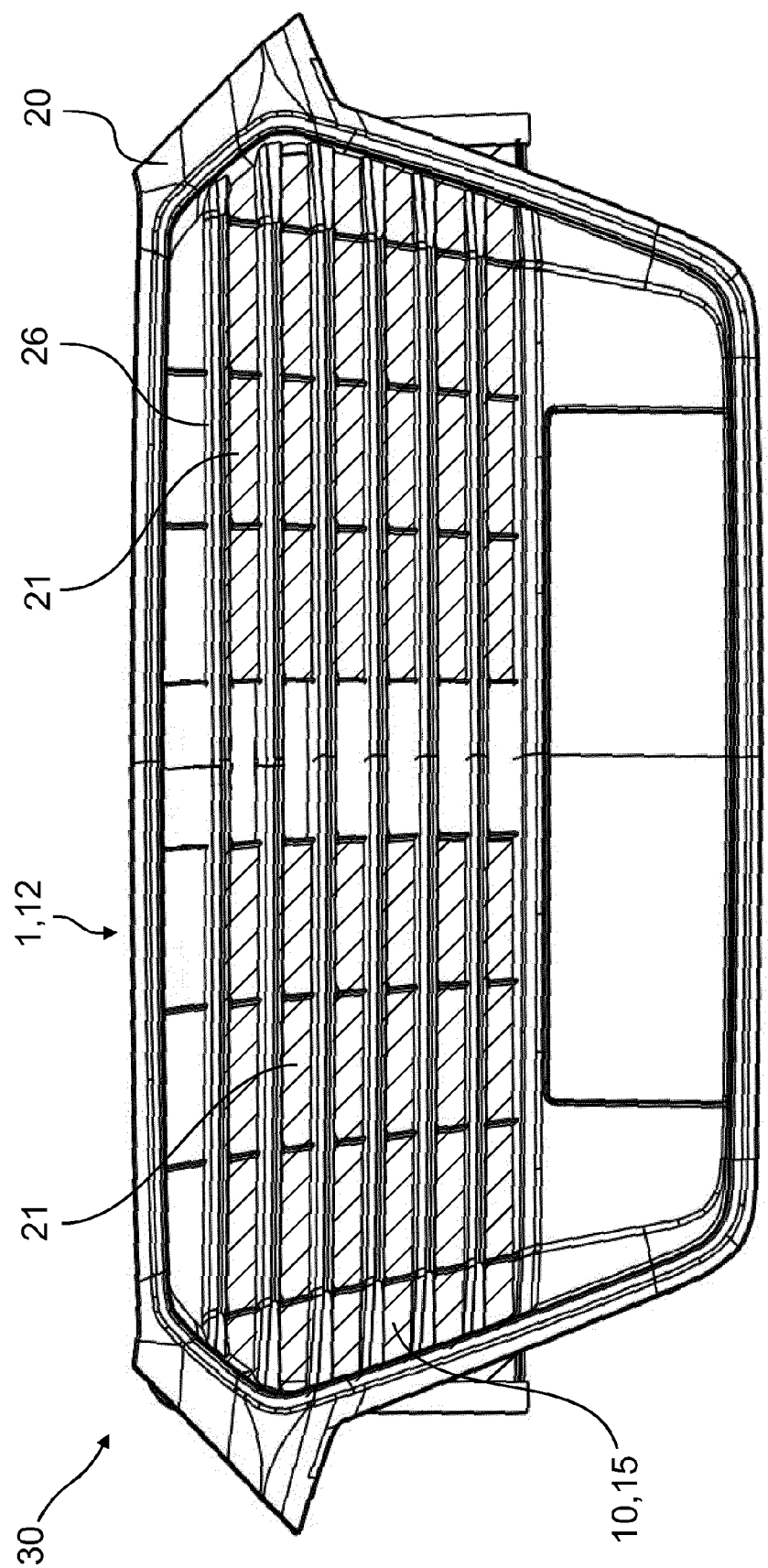
FIG. 2 shows a second front view of parts of a front end element according to the invention.

Parts of an embodiment of a front end element 30 according to the invention are essentially depicted in a front view in FIG. 1 and FIG. 2. In particular, part of the bumper cover 20 and the radiator grille 26 can be seen here. Furthermore, it can be clearly seen in FIG. 1 that the opening 21 in the bumper cover 20 has been opened for an air flow through the opening 21. The roller blind element 10 (not visible in FIG. 1) is in its first position 11, in which it opens up the opening 21 in the bumper cover 20. In contrast thereto, the roller blind element 10 of the device 1 for regulating an air flow is in its second position 12 in FIG. 2. The roller blind element 10, in particular the fabric 15 of the roller blind element 10, is clearly visible through the radiator grille 26. The opening 21 in the bumper cover 20 is completely closed by said roller blind element 10 in a second position 12. Of course, further second positions 12, in which the opening 21 in the bumper cover 20 is merely partially closed, are also conceivable. It can also be clearly seen that, when a roller blind element 10 is in its first position 11 (FIG. 1), the air flow can flow onto a radiator device (not depicted), whereas, when a roller blind element 10 is in its second position 12 (FIG. 2), said air flow cannot flow through the fabric 15 of the roller blind element 10 onto the radiator element. This may be of advantage, for example, when the engine is in a heating-up phase or when the aerodynamic drag of the vehicle is intended to be reduced.

Figure 3:
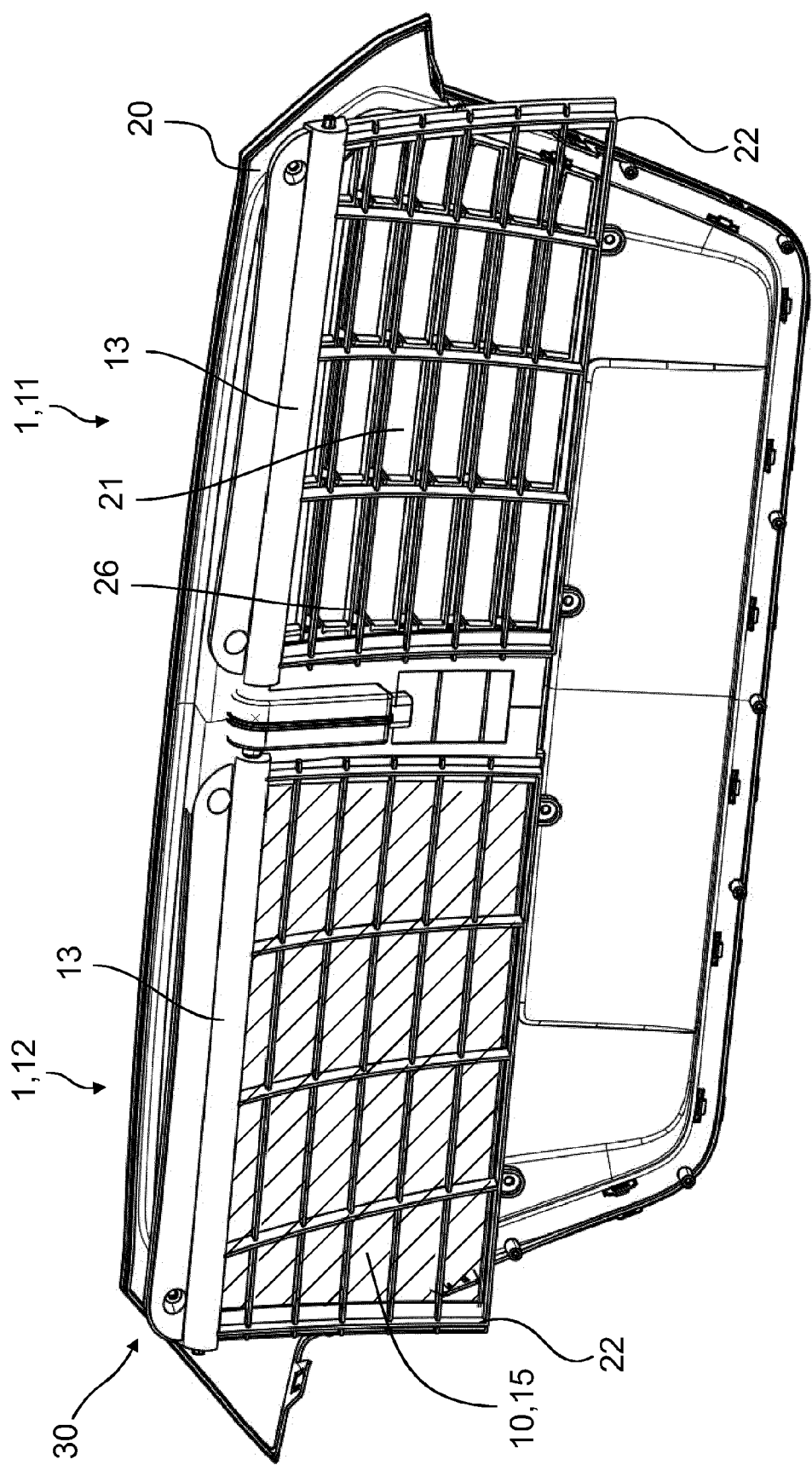
FIG. 3 shows a rear view of parts of a front end element according to the invention.

FIG. 3 shows a rear view of parts of a front end element 30 according to the invention. In contrast to the view in FIGS. 1 and 2, the radiator grille 26 and the bumper cover 20 can therefore now be seen from the rear. The front end element 30 is furthermore configured with two devices 1 for regulating an air flow. In this case, the left device 1 for regulating an air flow is shown with a closed roller blind element 10 in its second position 12, and the right device 1 for regulating an air flow is shown with an open roller blind element 10 (not visible) in its first position 11. This serves to clarify the spatial arrangement of the individual components. For example, it can be seen, in the case of the right device 1 for regulating an air flow, that the supporting element 22, which is configured in the manner of a lattice, is matched in its lattice structure to the radiator grille 26. This permits a particularly good air flow onto a radiator device when the roller blind elements 10 of the devices 1 for regulating an air flow are in their first positions 11. The roller blind element 10 of the right device (not visible) is rolled up on the drive element 13. The roller blind element 10 is clearly visible in the case of the left device 1 for regulating an air flow, which device is depicted with a closed roller blind element 10. The roller blind element 10 is in its second position 12 here. In particular, it can be seen that the fabric 15 of the roller blind element 10 of the device 1 for regulating an air flow is located between the supporting element 22 and the radiator grille 26. The radiator grille 26 is covered here by the roller blind element 10 and is no longer visible. The fabric 15 of the roller blind element 10 is therefore supported by the supporting element 22. A fluttering and, in the worst case, tearing of the roller blind element 10 can therefore be reliably prevented. The roller blind element 10 is driven by a drive element 13, which is configured in the present case as a winding element. In the second position 12 shown, the opening 21 is completely covered. Of course, a plurality of second positions 12, in which the opening 21 is only partially closed, are also conceivable. Furthermore, together with an, as depicted, curved geometry of those sections of the supporting element 22 which are used for the support, a curved shape of the roller blind element 10 in its second position 12 can also be achieved. In particular, those sections of the supporting element 22 which are used for supporting the roller blind element 10 are configured here to be rounded in order to prevent destruction of the roller blind element 10.

Figure 4:
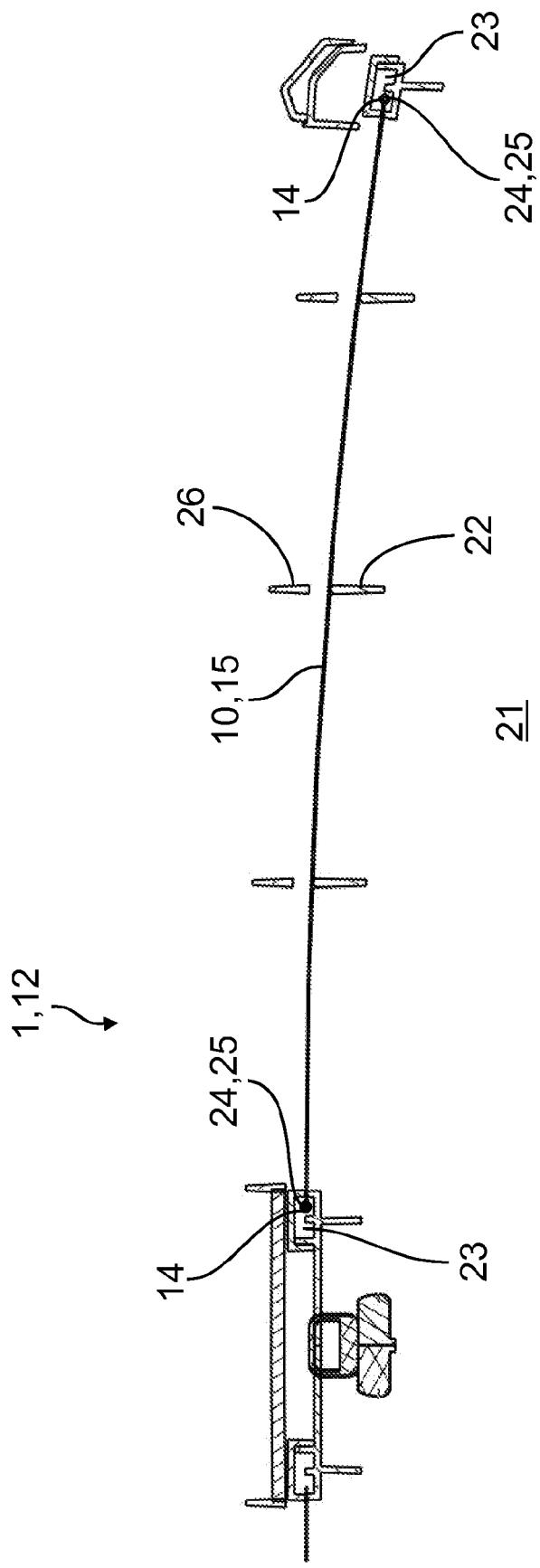
FIG. 4 shows a sectional view of parts of a front end element according to the invention.

FIG. 4 shows a sectional view of parts of a device 1 according to the invention for regulating an air flow, which device is arranged behind a radiator grille 26. The sectional plane is perpendicular to the closure direction of the roller blind element 10 and perpendicular to the air flow through the opening 21. The fabric 15 of the roller blind element 10 is located here in particular between the supporting element 22 and the radiator grille 26. A receptacle 23 for receiving the roller blind element 10 is arranged in each case at two opposite ends of the supporting element 22, said ends in particular also constituting a left and a right end of the opening 21. In the region of said receptacles, the roller blind element 10 is designed as a border 14, wherein the border 14 is configured in particular for encompassing a guide element 24, which is configured as an inner support 25, of the supporting element 22. When the roller blind element 10 is adjusted from its first position 11 into its second position 12, the border 14 is pushed in each case onto the fixed inner support 25. This permits a particularly reliable adjustment of the roller blind element 10 from its first position 11 into its second position 12. Furthermore, an upper and a lower end of the opening 21 is defined by the receptacles 23. Owing to the fact that the roller blind element 10 is accommodated in said receptacles 23, the entire opening 21 can be closed by the roller blind element 10. A particularly defined control of the air flow to the radiator device of the vehicle is thereby possible.

Figure 5:
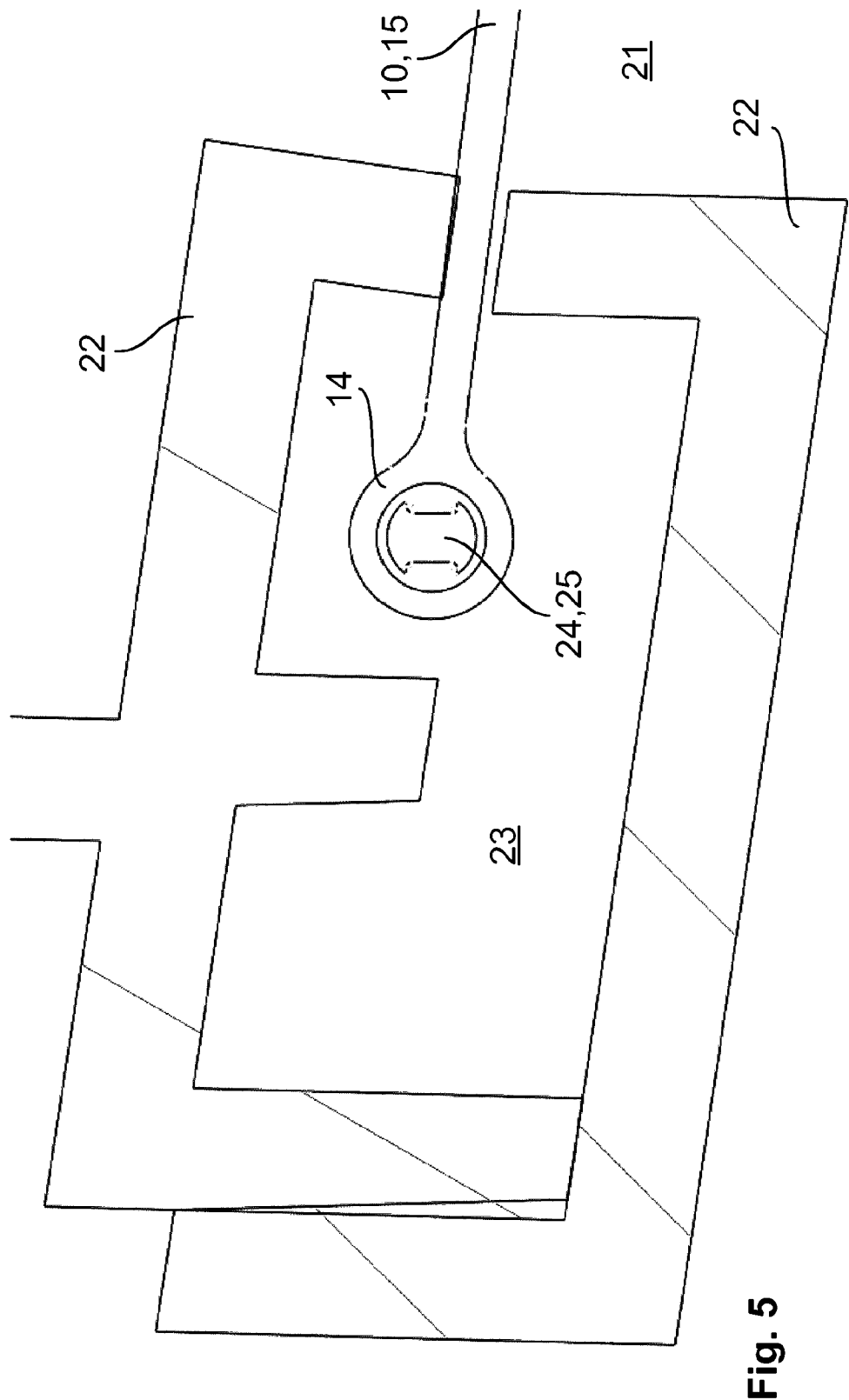
FIG. 5 shows an enlarged sectional view of parts of a front end element according to the invention.

FIG. 5 shows an enlarged partial view of the image from FIG. 4. It is clearly apparent that the border 14 at the end of the fabric 15 of the roller blind element 10 encompasses a guide element 24, which is configured as an inner support 25. The border here can be woven, in particular seamlessly. Both the border 14 and the inner support 25 are located here within the receptacle 23 of the supporting element 22. The sizes of the individual components are dimensioned in such a manner that the inner support 25, and therefore also the border 14, which encompasses the inner support 25, of the fabric 15 of the roller blind element 10 cannot slip out of the receptacle 23. A particularly secure support of the roller blind element 10 in the receptacle 23 is thereby achievable. Even at high air contact pressures, a reliable and stable closing of the opening 21 by the fabric 15 of the roller blind element 10 can thus be achieved.

FIG. 6 shows an embodiment of a device 1 according to the invention for regulating an air flow. In this case, the roller blind element 10 of the device 1 according to the invention is in a second position 12 which only partially closes the opening 21. For this purpose, the fabric 15 is unrolled by a drive element 13, which is configured as a winding element, when the roller blind element 10 is moved into its second position 12. The borders 14 are guided in receptacles 23 of the supporting element 22 during the movement. At the same time, guide elements 24, which are configured as inner supports 25, of the supporting element 22 are encompassed by the borders 14 of the roller blind element 10. As a result, a secure support of the roller blind element 10 over the entire concealed opening 21 can be ensured at all times. Tearing or fluttering of the borders 14 of the roller blind element 10 can thus be reliably avoided. In order to prevent damage to, or destruction of, the fabric 15 of the roller blind element 10 by the supporting element 22, those sections of the supporting element 22 which are used for the support are designed to be smooth, in particular rounded. The visible lattice-like configuration of the supporting element 22 furthermore firstly permits a particularly stable construction but secondly also permits as great an air permeability for the air flow to the radiator device of the vehicle as possible.

FIG. 7 shows a further embodiment of a device 1 according to the invention for regulating an air flow. In contrast to the embodiment which is shown in FIG. 6, this embodiment of the roller blind element 10 has a further border 14 in the center of the surface of the fabric 15. Said border 14 is likewise configured to encompass a guide element 24, which is configured as an inner support 25. An additional support in the center or in the interior of the fabric 15 of the roller blind element 10 can thereby also be achieved. This is of advantage in particular when particularly large contact pressures, in particular, for example, because of very high speeds, have to be compensated for.

The above explanation of the embodiments describes the present invention only within the context of examples. Individual features of the embodiments can, of course, be freely combined with one another, if technically expedient, without departing from the scope of the present invention.

LIST OF REFERENCE NUMBERS 1 device for regulating an air flow
10 roller blind element
11 first position
12 second position
13 drive element
14 border
15 fabric/sheeting
20 bumper cover
21 opening
22 supporting element
23 receptacle
24 guide element
25 inner support
26 radiator grille
30 front end element

What is claimed is:

1. A device (1) for regulating an air flow to a radiator device of a vehicle, wherein the air flow is conducted through at least one opening (21) in a bumper cover (20) onto the radiator device, and a roller blind element (10) which is adjustable between a first position (11) and at least one second position (12) is provided, wherein the roller blind element (10) opens up the opening (21) in the first position (11) and at least partially closes said opening in the at least one second position (12), characterized in that a supporting element (22) which supports the roller blind element (10) in the at least one second position (12) is provided on and/or in the opening (21); wherein the supporting element (22) has at least one guide element (24) for guiding the roller blind element (10) during the adjustment of the roller blind element (10).

2. The device (1) for regulating an air flow as claimed in claim 1, characterized in that the supporting element (22) is configured in the manner of a lattice.

3. The device (1) for regulating an air flow as claimed in claim 2, characterized in that those sections of the supporting element (22) which are used for supporting the roller blind element (10) are configured to be smooth.

4. The device (1) for regulating an air flow as claimed in claim 2, characterized in that the supporting element (22) is designed as a part of the bumper cover (20).

5. The device (1) for regulating an air flow as claimed in claim 2, characterized in that those sections of the supporting element (22) which are used for supporting the roller blind element (10) are configured to be rounded.

6. The device (1) for regulating an air flow as claimed in claim 2, characterized in that the supporting element (22) is designed as a supporting part of the bumper cover (20).

7. The device (1) for regulating an air flow as claimed in claim 1, characterized in that those sections of the supporting element (22) which are used for supporting the roller blind element (10) are configured to be smooth.

8. The device (1) for regulating an air flow as claimed in claim 1, characterized in that the supporting element (22) is designed as a part of the bumper cover (20).

9. The device (1) for regulating an air flow as claimed in claim 1, characterized in that the device (1) has a drive element (13) for adjusting the roller blind element (10).

10. The device (1) for regulating an air flow as claimed in claim 9, characterized in that that the drive element (13) is configured as a winding element.

11. The device (1) for regulating an air flow as claimed in claim 1, characterized in that the supporting element (22) has at least one receptacle (23) for receiving a border (14) of the roller blind element (10).

12. The device (1) for regulating an air flow as claimed in claim 1, characterized in that the at least one guide element (24) is configured as an inner support (25) which can be encompassed by a border (14) of the roller blind element (10).

13. The device (1) for regulating an air flow as claimed in claim 1, characterized in that the roller blind element (10) comprises a technical fabric (15) and/or a sheeting (15), in particular a plastics sheeting, and/or a fiber composite material.

14. The device (1) for regulating an air flow as claimed in claim 1, characterized in that one or more visible parts of the roller blind element (10) is colored.

15. The device (1) for regulating an air flow as claimed in claim 1, characterized in that the roller blind element (10) is of multi-part configuration.

16. The device (1) for regulating an air flow as claimed in claim 1, characterized in that the roller blind element (10) is configured for the at least partial horizontal or vertical closing of the at least one opening (21).

17. The device (1) for regulating an air flow as claimed in claim 1, characterized in that those sections of the supporting element (22) which are used for supporting the roller blind element (10) are configured to be rounded.

18. The device (1) for regulating an air flow as claimed in claim 1, characterized in that the supporting element (22) is designed as a supporting part of the bumper cover (20).

19. A front end element (30) for a vehicle, at least having an assembly support, a radiator device, a bumper cover (20), wherein the radiator device and the bumper cover (20) are fastened to the assembly support, a radiator grille (26) arranged on the bumper cover (20), wherein at least one opening (21) for conducting an air flow onto the radiator device is provided in the bumper cover (20), and a device (1) for regulating the air flow with a roller blind element (10), wherein the roller blind element (10) is adjustable between a first position (11) and at least one second position (12), and wherein the roller blind element (10) opens up the at least one opening (21) in the first position (11) and at least partially closes said opening in the at least one second position (12), characterized in that a supporting element (22) which supports the roller blind element (10) in the at least one second position (12) is provided on and/or in the opening (21); wherein the supporting element (22) has at least one guide element (24) for guiding the roller blind element (10) during the adjustment of the roller blind element (10).

20. The front end element (30) for a vehicle as claimed in claim 19, characterized in that the supporting element (22) of the device (1) for regulating an air flow, is configured in a manner of a lattice.

21. The front end element (30) for a vehicle as claimed in claim 20, characterized in that the roller blind element (10) is arranged between the bumper cover (20) and the radiator grille (26).

22. The front end element (30) for a vehicle as claimed in claim 19, characterized in that the roller blind element (10) is arranged between the bumper cover (20) and the radiator grille (26).

* * * * *